United States Patent

Saunders

[15] 3,648,187

[45] Mar. 7, 1972

[54] NOTCH FILTER NETWORK WITH CONTROLLABLE RESPONSE

[72] Inventor: Teddy G. Saunders, Atherton, Calif.

[73] Assignee: The Vadic Corporation, Palo Alto, Calif.

[22] Filed: Aug. 24, 1970

[21] Appl. No.: 66,194

[52] U.S. Cl. ....................................330/21, 330/51, 330/176, 330/13, 330/75

[51] Int. Cl. ..............................................................H03f 3/04

[58] Field of Search ......................................330/103, 51, 21

[56] References Cited

UNITED STATES PATENTS 3,369,189 2/1968 Hoffman et al. ....................330/103 X

OTHER PUBLICATIONS

EEE– September 1969 pp. 46 & 48, " High-Q Active Twin-T" BY Dobkin, R.

*Primary Examiner*—Nathan Kaufman
*Attorney*—Harvey G. Lowhurst

[57] ABSTRACT

A filter network is provided which will pass a first band of frequencies and attenuate a second band of frequencies, and which is programmable to reverse its operation and attenuate the first bank of frequencies and pass the second band of frequencies. The network includes a twin-T filter network, and a pair of amplifiers are connected between the twin-T filter and the network input. By reversing the connections of the amplifiers to the twin-T network, the pass and attenuation bands of the overall network may be reversed while the gain is maintained constant.

7 Claims, 3 Drawing Figures

INVENTOR

TEDDY G. SAUNDERS

BY Harvey [signature]

Att'y.

NOTCH FILTER NETWORK WITH CONTROLLABLE RESPONSE

RELATED APPLICATIONS

Application Ser. No. 66,271, filed Aug. 24, 1970 entitled Bandpass Filter With Controllable Resonant Frequency, and assigned to the same assignee as the present application, discloses and claims a bandpass filter network in which the pass band is controllably variable without affecting either the network gain or bandwidth.

BACKGROUND OF THE INVENTION

1. Field of the Invention

This invention related in general to filter networks, and relates more particularly to such networks in which the band of frequencies attenuated is controllably variable between two values in response to an input command signal.

2. Description of the Prior Art

It is well known in the art of filter design to utilize a parallel or twin-T network in conjunction with a feedback amplifier to produce a resultant network which forms a notch filter for attenuating a given frequency or band of frequencies. Such networks are satisfactory for producing attenuation of a single frequency or frequency range, but they are not appropriate for use where it is desired to vary the frequency or frequency range to be attenuated, such as may occur in a data transmission system employing two frequency division multiplexing channels where information is transmitted in one channel and received in another and the respective transient and receive channels may be reversed.

Utilizing the prior art networks, it would be necessary either to provide a first filter network for the first frequency band or frequency range and a second separate network for the second frequency band or frequency range, and to switch back and forth between these two networks as desired, or to provide ganged adjustment of the elements of the filter network to switch frequency response. The dual network approach has the disadvantage of requiring two such complete networks, with the attendant increase in components utilized. The ganged adjustment method has not proved satisfactory because of the precision elements required and the nonuniform attenuation at the different frequencies which has resulted.

SUMMARY OF THE INVENTION

In accordance with the present invention, there is provided a filter network employing a single twin-T network and associated feedback amplifier, and this network is operable to produce attenuation of either of two frequency bands in response to an input command signal. This is accomplished in the present invention by providing a pair of selectively connectable amplifiers between the filter network input and the input to the twin-T network. The gains of these amplifiers are such in relation to the parameters of the rest of the circuit that with the amplifiers connected in a first manner to the twin-T network, the overall filter network will attenuate a first band of frequencies and will pass a second band of frequencies. When the connections of the amplifiers are reversed, the network operates to pass the first band of frequencies and to attenuate the second band of frequencies.

This connection of the amplifiers may be controlled by an input control signal so that the overall network is operable to alternately pass one frequency band and attenuate another band and then attenuate the one frequency band and pass the other.

OBJECTS OF THE INVENTION

It is therefore an object of the present invention to provide an improved notch filter network.

It is a further object of this invention to provide a notch filter network which is operable to pass a first band of frequencies and attenuate a second band of frequencies in one condition, and which can be controllably switched to another condition in which it attenuates the first band of frequencies and passes the second band of frequencies.

It is an additional object of the present invention to provide a notch filter network employing a single twin-T network and feedback amplifier, in which the band of frequencies attenuated may be varied between a first value and a second value in response to an input control signal.

Objects and advantages other than those set forth above will be apparent from the following description when read in connection with the accompanying drawing; in which:

DESCRIPTION OF THE PREFERRED EMBODIMENT

Figure 1:
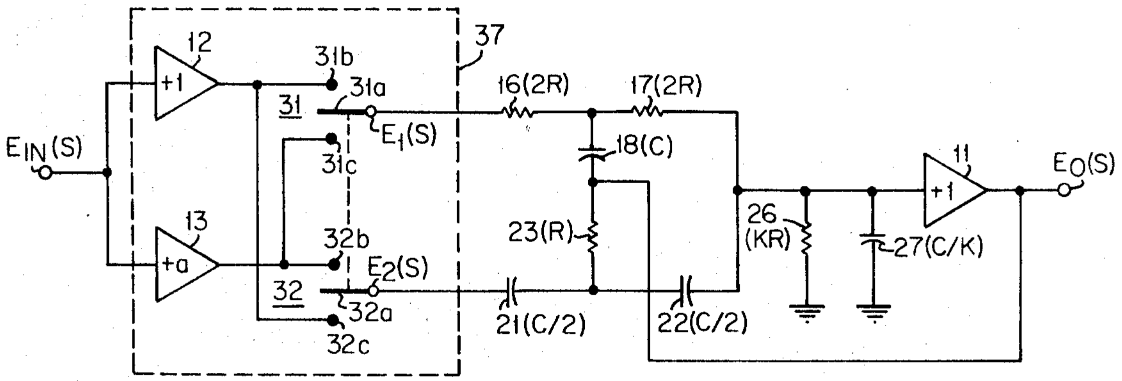
FIG. 1 is a circuit diagram of an ideal representation of the filter network of the present invention.

The operation of the present invention may best be understood by reference to the circuit diagram of FIG. 1. This is an ideal representation of the filter network of the invention and includes amplifiers 11, 12 and 13 having gains of +1, +1 and $+a$ respectively, where $a \leq 1$. The filter network also includes a twin-T network having a first branch including resistors 16, 17 and a capacitor 18, and having a second branch including capacitors 21, 22 and a resistor 23. Resistors 16, 17 and 23 have values of 2R, 2R and R, respectively, while capacitors 18, 21 and 22 have values of C, C/2 and C/2, respectively. The filter network also includes a resistor 26 having a value of KR and a capacitor 27 having a value of C/K. Resistor 26 and capacitor 27 are connected between the input of amplifier 11 and ground as shown.

In the ideal representation of FIG. 1, amplifiers 12, 13 are shown selectively connectable to the input of the twin-T network through ganged switches 31 and 32 having a first element 31*a* and a second element 32*a*. Element 31*a* is selectively engageable with either of two contacts 31*b* or 31*c*, while element 32*a* is similarly engageable with either contact 32*b* or 32*c*. With contacts 31*b* and 32*b* engaged, amplifiers 12 and 13 are connected to the inputs of the twin-T network in one manner, while the amplifier connections thereto are reversed when contacts 31*c* or 32*c* are engaged.

From a study of the ideal representation of FIG. 1, it can be seen that the transfer function of this network is of the form:

$$\frac{E_0(S)}{E_{in}(S)}=\frac{G[S/\omega 0)^2+1]}{(S/\omega_p)^2+\frac{1}{Q}(S/\omega_p)+1}$$

where:

$G$ is a gain constant.

$\omega_p$ is the resonant frequency of the denominator polynomial;

$\omega_0$ is the resonant frequency of the numerator polynomial;

$Q$ is a function of the denominator polynomial bandwidth (BW) and equals $\omega_p$/BW; and $S$ is the Laplace transform.

As a function of the parameters in FIG. 1:

$$\omega_p=\frac{1}{RC},$$

$$Q=\left(\frac{1}{2}+\frac{K}{8}\right),$$

$$G=\frac{1}{1+4/K}$$

where $R$ is the resistance of element 23

$C$ is the capacitance of element 18 and $K$ is a constant.

With the switch in position to engage contacts **31*b* and 32*b***, it can be seen that $$\omega_{02} = 1/\sqrt{a}RC = \omega_p/\sqrt{a}$$

With the switch in position to engage contacts **31*c* and 32*c***, $$\omega_{01} = \sqrt{a}/RC = \omega_p \sqrt{a}$$

where in both equations $a$ is the circuit gain.

From this, it can be seen that $\omega_p$, G and Q are independent of the switch position, while $\omega_O$ is a direct function of the switch position.

Figure 2:
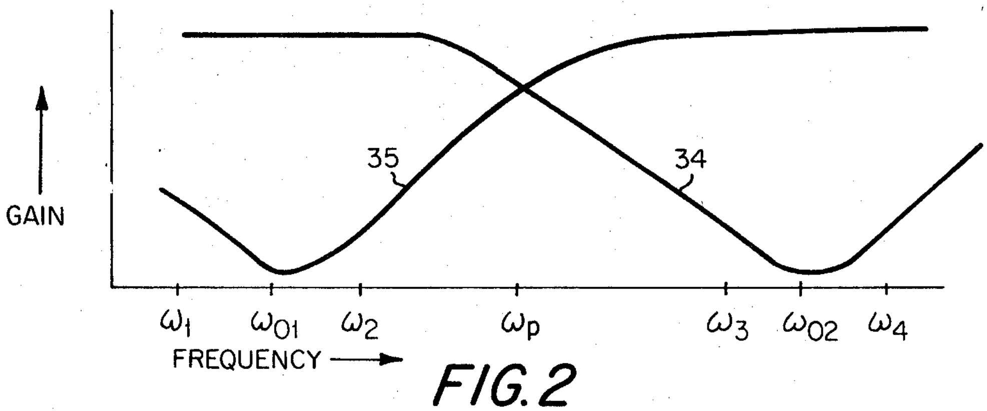
FIG. 2 contains graphs showing the response characteristics of the network of FIG. 1.

If $\omega_p$ is chosen as the geometric mean between the two frequency bands of interest, if $\omega_{01}$ and $\omega_{02}$ are chosen in the center of these bands, and if Q is chosen to equal $$\frac{\omega_p}{\omega_{02}-\omega_{01}}$$

then the design objectives shown in the curves of FIG. 2 can be met. FIG. 2 is a plot of gain versus frequency and shows a first network characteristic curve 34 when the switch is in a first position engaging contacts **31*b* and 32*b*, and a second network characteristic curve 35 representing the response when the switch is in the other position engaging contacts 31*c* and 32*c***.

From curve 34, it will be seen that the network is effective to attenuate the frequencies in the band from $\omega_3$ to $\omega_4$, while passing the frequencies in the second band of interest from $\omega_1$ to $\omega_2$. Similarly, with the switch position reversed, curve 35 shows that the frequencies in the band from $\omega_3$ to $\omega_4$ are now passed, while the frequencies in the band $\omega_1$ to $\omega_2$ are now attenuated. Thus, the filter network of the present invention is operable to pass a first band of frequencies and attenuate a second band of frequencies under one condition, and to be controllable to reverse this situation to pass the second band of frequencies and attenuate the first band.

It will be understood that the mechanical switch shown in the ideal circuit representation of FIG. 1 is illustrative only, and that in practice other suitable switching means are usually employed. For example, the circuit of FIG. 3 has been employed to provide the switching and amplifying functions of amplifiers 12, 13 and the switches 31 and 32 of FIG. 1 as indicated by the dotted enclosure 37. This circuit includes transistors 41, 42, 43, 44 each having bases, collectors and emitters. The circuit further includes resistors 46, 47, 48 and 49 which are identified as $R_1$, $R_2$, $R_3$ and $R_4$, respectively, and furthers resistors 51 and 52. The values of resistors are chosen such that the gain $a$ of the circuit is $$a = \frac{R_2}{R_1+R_2} = \frac{R_4}{R_3+R_4}$$

A controlling input signal for varying the response of the filter network is supplied to terminals 55 and 56 connected to the bases of transistors 41 and 42. With a negative voltage on the base of transistor 41 and a positive voltage on the base of transistor 42, $$E_1(S) = E_{in}(S)$$
$$E_2(S) = aE_{in}(S)$$

Because the higher gain signal $E_1(S)$ is coupled to the low-pass section and the lower gain signal $E_2(s)$ is coupled to the high-pass section of the twin-T network the lower frequency band $\omega_1$–$\omega_2$ is passed and the higher frequency band $\omega_3$–$\omega_4$ is attenuated.

This corresponds to the first switch position of FIG. 1 in which contacts **31*b* and 32*b* are engaged, and results in a characteristic represented by the curve 34 of FIG. 2**, in which the band of frequencies from $\omega_3$ to $\omega_4$ is attenuated and the band of frequencies from $\omega_1$ to $\omega_2$ is passed.

When the input control signal to terminals 55 and 56 is reversed to thereby apply a positive voltage to the base of transistor 41 and a negative voltage to the base of transistor 42, the operation of the network is reversed to produce:

$$E_1(S)=a\ E_{in}(S)$$
$$E_2(S)=E_{in}(S)$$

Now, because the higher gain signal is $E_1(s)$ and $E_2(s)$ is coupled to the high-pass section while the lower gain signal is $E_1(s$ and is coupled to the low-pass section of the twin-T network, the lower frequency band $\omega_1$–$\omega_2$ is attenuated and the higher frequency band $\omega_3$–$\omega_4$ is passed.

This corresponds to the second position of the switch of FIG. 1 in which contacts **31*c* and 32*c* are engaged and result in a characteristic as shown by curve 35 of FIG. 2** in which the band of frequencies from $\omega_1$ to $\omega_2$ is attenuated while the frequencies in the band from $\omega_3$ to $\omega_4$ are passed.

Figure 3:
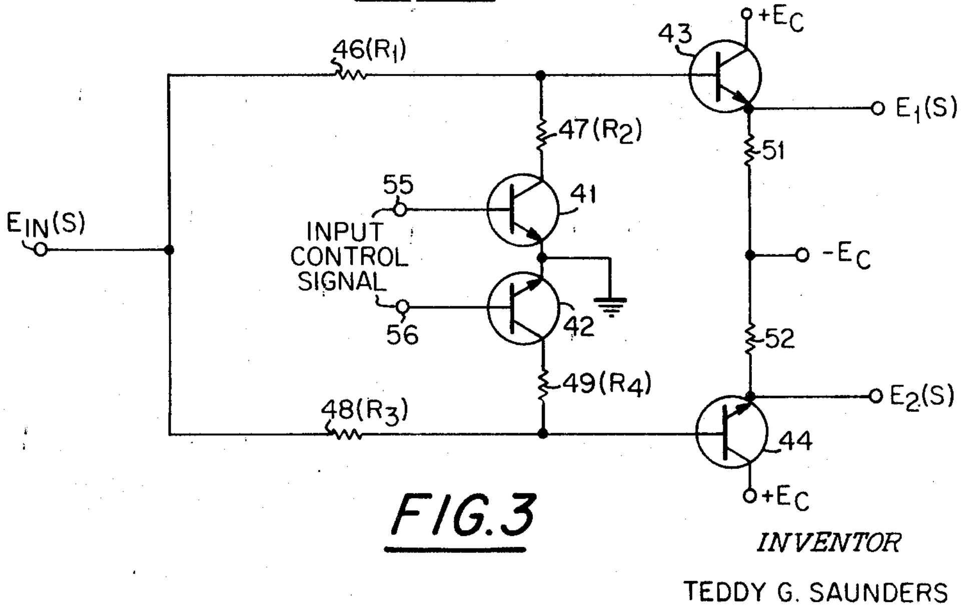
FIG. 3 is a circuit diagram showing the components employed in a portion of the ideal circuit of FIG. 1.

A filter network utilizing the circuit of FIGS. 1 and 3 has been built employing the following elements:

| | | |
|---|---|---|
| Resistor | 16 | 10 kilohms |
| | 17 | 10 kilohms |
| | 23 | 5 kilohms |
| | 26 | 69.8 kilohms |
| | 46 | 3.65 kilohms |
| | 47 | 5 kilohms |
| | 48 | 3.65 kilohms |
| | 49 | 5 kilohms |
| | 51 | 10 kilohms |
| | 52 | 10 kilohms |
| Capacitor | 18 | 0.02 μf |
| | 21 | 0.01 μf |
| | 22 | 0.01 μf |
| | 27 | 1500 pf |

Utilizing an input control signal to the bases of transistors 41 and 42 which varied from plus 12 volts to minus 3 volts, the filter network was operable under one condition to pass a first band of frequencies ranging from 1,020 Hz. to 1,320 Hz. while attenuating a second band of frequencies ranging from 1,975 Hz. to 2,275 Hz., and was further operable, by reversing the base voltages of transistors 41 and 42 as described above, to attenuate the first band of frequencies while passing the second band.

While the filter network of the present invention is particularly useful in data transmission employing frequency shift keying, where two different frequencies are employed to convey mark and space information, it will be appreciated that this invention is useful in any environment where it is desired to pass a first band of frequencies and attenuate a second band of frequencies under one condition, and to controllably reverse this condition to attenuate the first band of frequencies and pass the second band.

The present invention may be embodied in forms other than described above without departing from the spirit of the invention. The illustrated embodiment is to be considered as representative and not restrictive, the scope of the invention being indicated by the appended claims rather than by the foregoing description, and all changes which come within the meaning and range of equivalency of the claims are therefore intended to be covered herein.

What is claimed is:

1. An active filter network for filtering an input signal appearing on an input signal terminal to secectively attenuate signal components in either of two frequency bands; comprising:
   - an input signal terminal;
   - a twin-T filter network having a first input terminal and a second input terminal and first and second output terminals;
   - first amplifier means connected to said first and second output terminals;
   - second amplifier means having a third input terminal and a third output terminal;
   - third amplifier means having a fourth input terminal and a fourth output terminal;
   - means connecting said input signal terminal to said third and fourth input terminals; and
   - switch means connected to the output terminals of said second and said third amplifier means, said switch means having a first state for controlling said second and said third amplifier means to supply said input signal to said input terminal of said twin-T network with a first gain and to said second input terminal of said twin-T network with a second gain different from said first gain, said twin-T network attenuating a first band of frequencies in said input signal when said switch means is in said first state, said switch means having a second state for controlling said second and said third amplifiers to supply said input signal to said first input terminal of said twin-T network with said second gain and to said second input terminal of said twin-T network with said first gain, said twin-T network attenuating a second band of frequencies in said input signal different than first band when said switch means is in said second state; and control means for switching said switch means between said first state and said second state to vary the band of frequencies attenuated in said network.

2. A filter network in accordance with claim 1 in which said first gain is unity and said second gain is less than unity.

3. A filter network in accordance with claim 2 in which said first amplifier means has a gain of unity.

4. A filter network in accordance with claim 1, further comprising first and second voltage divider means coupled between said input signal terminal and said switch means, said first voltage divider means being further coupled to said second amplifier means and said second voltage divider means being further coupled to said third amplifier means.

5. A filter network in accordance with claim 4 in which said switch means further comprises a pair of transistors having their collector electrodes connected to said first and said second voltage divider means, respectively and having their base electrodes connected to said control means.

6. A filter network in accordance with claim 4 wherein said voltage divider means includes a first voltage divider connected between said input signal terminal, said switch means and said first amplifying means and a second voltage divider connected between said input signal terminal, said switch means and said second amplifying means, said first and said second voltage dividers each including a first resistive element and a second resistive element, the ratio of the resistance of said first resistive element to the sum of the resistances of said first and second resistive elements defining said second gain of less than unity.

7. A filter network in accordance with claim 1 including control means connected to said switch means for switching said switch means between said first state and said second state to vary the band of frequencies attenuated in said filter network.

* * * * *